US009262544B2

(12) United States Patent
Reimann et al.

(10) Patent No.: US 9,262,544 B2
(45) Date of Patent: Feb. 16, 2016

(54) TRANSLATING BETWEEN ADDRESS REPRESENTATIONS

(75) Inventors: Falk Reimann, Heidelberg (DE); Gautam Dharamshi, Sunnyvale, CA (US); Jian Xu, Santa Clara, CA (US); Yang-Cheng Fan, San Jose, CA (US)

(73) Assignee: SAP SE, Walldorf (DE)

( * ) Notice: Subject to any disclaimer, the term of this patent is extended or adjusted under 35 U.S.C. 154(b) by 1294 days.

(21) Appl. No.: 12/569,411

(22) Filed: Sep. 29, 2009

(65) Prior Publication Data

US 2011/0078553 A1    Mar. 31, 2011

(51) Int. Cl.
*G06F 17/20* (2006.01)
*G06F 17/30* (2006.01)
*G06F 17/22* (2006.01)

(52) U.S. Cl.
CPC .......... *G06F 17/30876* (2013.01); *G06F 17/20* (2013.01); *G06F 17/2235* (2013.01)

(58) Field of Classification Search
CPC ............................. G06F 17/2235; G06F 17/20
USPC ......................................................... 715/234
See application file for complete search history.

(56) References Cited

U.S. PATENT DOCUMENTS 5,974,371 A * 10/1999 Hirai et al. ........................ 704/2
6,985,936 B2 * 1/2006 Agarwalla et al. ............. 709/221
7,404,008 B2 * 7/2008 Takeuchi et al. ............... 709/245
2008/0072249 A1   3/2008 Hovnanian et al.

FOREIGN PATENT DOCUMENTS

WO    WO 01/82023    11/2001

OTHER PUBLICATIONS

'Apache HTTP Server Version 2.2—Apache Module mod_rewrite' [online] Apache, Jun. 19, 2008, [retrieved on Sep. 29, 2009]. Retrieved from the Internet: <URL: http://web.archive.org/web/20080619130900/http:/httpd.apache.org/docs/2.2/mod/mod_rewrite.html>, 15 pages.
'Introduction to IIS URL Rewriting' [online] BuildTelligence, Dec. 28, 2007, [online] Retrieved from the Internet: <URL: http://web.archive.org/web/20071228062528/http:/www.buildtelligence.com/iis-url-rewrite.htm>, 4 pages.
'Apache HTTP Server Version 2.2—URL Rewriting Guide' [online]. Apache, 2009, [retrieved on Sep. 29, 2009]. Retrieved from the Internet: <URL: http://httpd.apache.org/docs/2.2/misc/rewriteguide.html>, 21 pages.

(Continued)

*Primary Examiner* — Kavita Padmanabhan
*Assistant Examiner* — Tionna Burke
(74) *Attorney, Agent, or Firm* — Fish & Richardson P.C.

(57) ABSTRACT

Translation of uniform resource locators (URLs). A URL is received, in a computer system and from a computer device, referring to a resource managed by a first application in the computer system, for which resource the computer system uses an internal URL. A first rule set is selected from among multiple rule sets assigned to a respective one of multiple applications, based on the first rule set being assigned to the first application. At least a portion of the URL is matched with a rule in the first rule set identifying an internal URL portion as corresponding to the portion of the URL. The internal URL portion is included in a translated URL, wherein a second rule set identifies another internal URL portion as corresponding to the portion of the URL. At least part of the resource is forwarded to the computing device.

4 Claims, 8 Drawing Sheets

(56) References Cited

OTHER PUBLICATIONS

'ISAPI_Rewrite 3.1' [online]. Best Software Downloads, 2006 [retrieved on Sep. 29, 2009]. Retrieved from the Internet: <URL: http://www.bestsoftware4download.com/software/k-virtual-hosts-php-and-mysql-mac-t-free-isapi-rewrite-download-fszctjtz.html>, 2 pages.
'ISAPI_Rewrite 3—Apache .htaccess mod_rewrite compatible module for IIS' [online] Helicon Tech., 2002-2008, [retrieved on Sep. 29, 2009]. Retrieved from the Internet: <URL: http:// web.archive.org/web/20080803063735/http:/www.helicontech.com/isapi_rewrite>, 2 pages.
'SEF Advance' [online] Sakic.Net, 2001-2008, [retrieved on Sep. 29, 2009]. Retrieved from the Internet: <URL: http://web.archive.org/web/20080821233006/http:/www.sakic.net/products/sef_advance/documentation/>, 7 pages.
European Search Report for Application No. EP 10007590.2, dated Apr. 11, 2010, 7 pages.
Summons to Attend Oral Proceedings Pursuant to Rule 115(1) EPC, EP Appln No. 10007590.2, dated Aug. 27, 2013, 150 pages.

* cited by examiner

TRANSLATING BETWEEN ADDRESS REPRESENTATIONS

TECHNICAL FIELD

This specification relates to translating an address, such as a Uniform Resource Locator (URL), from a first representation to a second representation.

BACKGROUND

A web browser is a software application for retrieving, presenting, and traversing information resources on the World Wide Web. An information resource is identified by a URL and may be a web page, image, video, or other piece of content. Hyperlinks present in resources enable users to easily navigate their browsers to related resources. Aside from hypertext markup language (HTML), web browsers can generally display any kind of content that can be embedded as part of a web page. Most browsers can display images, audio, video, and XML files, and often have plug-ins to support embedded applications, such as Flash applications, and Java applets.

SUMMARY

In general, one aspect of the subject matter described in this specification can be embodied in methods that include the actions of receiving, in a computer system and from a computer device, a uniform resource locator (URL), the URL referring to a resource managed by a first application of multiple applications in the computer system, for which resource the computer system uses an internal URL, selecting a first rule set of multiple rule sets in the computer system, each of the multiple rule sets assigned to a respective one of the multiple applications, the selection made based on the first rule set being assigned to the first application, matching at least a portion of the URL with a rule in the first rule set, the rule identifying an internal URL portion as corresponding to the portion of the URL, including at least the internal URL portion in a translated URL corresponding to the URL, wherein a second rule set assigned to another one of the multiple applications and not selected for the URL identifies another internal URL portion as corresponding to the portion of the URL, and forwarding, based on the translated URL matching the internal URL, at least part of the resource to the computing device. Other embodiments of this aspect include corresponding systems, apparatus, and computer programs, configured to perform the actions of the methods, encoded on computer storage medium.

These and other embodiments can each optionally include one or more of the following features. The one or more aspects can also include determining, after receiving the URL and before selecting the first rule set, that the URL is not an internal URL. Each of the multiple rule sets can also include at least one of a replacement rule causing one inclusion of the internal URL portion in the translated URL corresponding to a first matching of the replacement rule with the portion of the URL, a recursive rule causing a number of inclusions of the internal URL portion in the translated URL equal to a number of matches of the rule with the URL, an exclusive rule causing the internal URL portion not to be included in the translated URL corresponding to any matching of the rule with the portion of the URL, and a stop rule ceasing any further matching after the stop rule is matched with the portion of the URL. At least one framework rule can be assigned to each of the multiple rule sets, the framework rule matching a parameter with the portion of the URL for inclusion in the translated URL. The framework rule can be a language rule identifying a language parameter to be included in the translated URL based on a matching of the language rule with the portion of the URL. At least one of the multiple rule sets can include a page rule identifying a document identifier to be included in the translated URL based on a matching of the page rule with the portion of the URL. At least one of the multiple rule sets can include a module rule identifying an application identifier corresponding to the first application to be included in the translated URL based on a matching of the module rule with the portion of the URL. At least one of the multiple rule sets can include a parameter rule identifying a parameter to be provided to the first application to be included in the translated URL based on a matching of the parameter rule with the portion of the URL.

In general, another aspect the subject matter described in this specification can be embodied in methods that include the actions of accessing, in a computer system and in response to a request from a computer device, a first resource that includes at least one internal URL, the internal URL referring to a second resource managed by one application of multiple applications in the computer system, for which second resource the computer system uses the internal URL, selecting a first rule set of multiple rule sets in the computer system, each of the multiple rule sets assigned to a respective one of the multiple applications, the selection made based on the first rule set being assigned to the first application, matching at least a portion of the internal URL with a rule in the first rule set, the rule identifying a URL portion as corresponding to the portion of the internal URL, including at least the URL portion in the translated URL, wherein a second rule set assigned to another one of the multiple applications and not selected for the internal URL identifies another URL portion as corresponding to the portion of the internal URL, and forwarding, at least part of the first resource including the translated URL to the computing device. Other embodiments of this aspect include corresponding systems, apparatus, and computer programs, configured to perform the actions of the methods, encoded on computer storage medium.

These and other embodiments can each optionally include one or more of the following features. The one or more aspects can also include determining, after accessing the first resource and before selecting the first rule set, that the internal URL should be translated to a URL. Each of the multiple rule sets can include at least one of a replacement rule causing one inclusion of the URL portion in the translated URL corresponding to a first matching of the replacement rule with the portion of the internal URL, a recursive rule causing a number of inclusions of the URL portion in the translated URL equal to a number of matches of the rule with the internal URL, an exclusive rule causing the URL portion not to be included in the translated URL corresponding to any matching of the rule with the portion of the internal URL, and a stop rule ceasing any further matching after the stop rule is matched with the portion of the internal URL. At least one framework rule can be assigned to each of the multiple rule sets, the framework rule matching a parameter with the portion of the internal URL for inclusion in the translated URL. The framework rule can be a language rule identifying a language parameter to be included in the translated URL based on a matching of the language rule with the portion of the internal URL. At least one of the multiple rule sets can include a page rule identifying a document identifier to be included in the translated URL based on a matching of the page rule with the portion of the internal URL. At least one of the multiple rule sets can include a module rule identifying an application identifier corresponding to the first application to be included in the translated URL based on a matching of the module rule with the portion of the internal URL. At least one of the multiple rule sets can include a parameter rule identifying a parameter to be provided to the first application to be included in the translated URL based on a matching of the parameter rule with the portion of the internal URL.

In general, another aspect the subject matter described in this specification can be embodied in methods that include the actions of generating multiple applications accessible to a computer device using a communication device, the multiple applications managing resources that are identified using an internal URL representation, wherein the computer device uses an external URL representation for the resources, a rule engine including multiple rule sets assigned to respective ones of the multiple applications, each of the rule sets including rules that associate portions of external URLs with corresponding portions of internal URLs for the assigned application, and an address translation module configured to receive an untranslated URL, select one of the rule sets for the untranslated URL using the rule engine, generate a translated URL corresponding to the untranslated URL using the rule set, and process the translated URL in response to receiving the untranslated URL, wherein at least one of the rule sets includes a first rule that includes a different translation of one of an internal URL portion and an external URL portion than a second rule in another of the rule sets. Other embodiments of this aspect include corresponding systems, apparatus, and computer programs, configured to perform the actions of the methods, encoded on computer storage medium.

These and other embodiments can each optionally include one or more of the following features. At least one rule set of the multiple rule sets can include at least one rule generated by the rule engine in response to analyzing one or more rules of the rule set. Each rule of the multiple rule sets can specify at least one of a URL translation and a next rule to apply to the untranslated URL.

Particular embodiments of the subject matter described in this specification can be implemented to realize one or more of the following advantages. Particular embodiments can generate more readable URLs without requiring the user to use regular expressions; rules can be applied in a bi-directional manner which reduces the number of rules that a user needs to specify; rules provided by the user can be used to generate additional rules, which further reduces the number of rules that a user needs to specify; rules can be applied based on particular applications that the rules are assigned to, allowing rules to be applied in an application-specific manner; rules can be applied according to various language specific rules, allowing the translation to occur in any number of languages.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
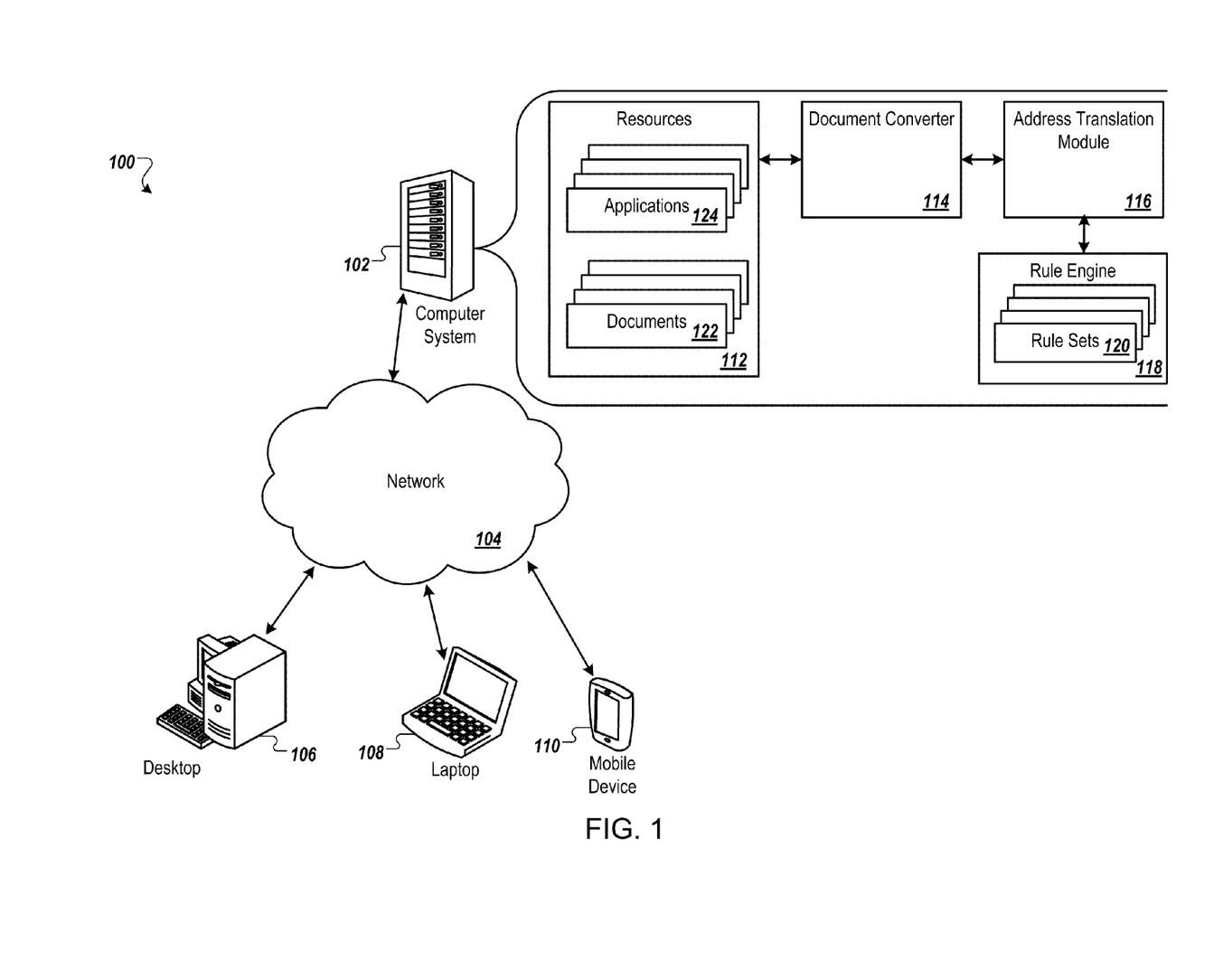
FIG. 1 shows an example system for translating a URL from an external URL to an internal URL and from an internal URL to an external URL.

FIG. 1 shows an example system 100 for translating a URL from an external URL to an internal URL and from an internal URL to an external URL. In general, an internal URL is a URL that references a particular resource managed by, or otherwise available to, a computer system 102. For example, in some implementations, an internal URL can be "www.mysite.com/sales_app:shop.xhtml?language=en&category_id=printers&product_id=123"

which specifies a document resource "shop.xhtml" and other resources, including a sales application. Other internal URLs are also possible, such as longer or shorter ones.

In general, an external URL is a search engine friendly (SEF) URL or other URL that is shorter, more user friendly, and/or more concise than the internal URL from which the external URL is based. For example, in some implementations, an external URL based on the internal URL above can be "www.mysite.com/en/sales/shop/category/printers/product/123."

Other external URLs are also possible, such as longer or shorter ones. Examples herein show that translation between internal and external URLs can be performed according to application-specific rule sets. For example, such a translation can begin with either an internal URL or an external URL and from it generate a corresponding one, which for clarity is here referred to as a translated URL. That is, the translated URL can be either an internal URL or an external URL depending on the direction of the translation.

The system 100 here includes a computer system 102, a network 104, and any number of computer devices 106-110. For simplicity, only one computer system 102, and a specific number of computer devices 106-110 are shown, but it should be understood that the system 100 can include any number of computer systems 102 and computer devices 106-110.

In general, the computer system 102 can include any computing apparatus that processes data stored on associated computer readable medium. Examples include, but are not limited to, a blade server, a workstation, a laptop, or a desktop computer. Furthermore, the computer system 102 can embody a web server or other types of servers, according to particular implementations. The computer system 102 includes one or more resources 112, a document converter 114, an address translation module 116, and a rule engine 118. In some implementations, for example, the resources 112 can include electronic documents 122 (e.g., a web page or other document) and applications 124. The computer system 102 can provide data that corresponds to the one or more resources 112 to any of the computer devices 106-110 in response to a request. For example, the computer system 102 can be implemented as a web or internet server and can forward at least a portion of a web page or other document 122, optionally including one or more applications 124 included the in the document 122, to the computer devices 106-110 in response to receiving a URL from any of the computer devices 106-110.

The rule engine 118 includes a number of rule sets 120. In some implementations, each rule set is specified using the extensible markup language (XML) format. A rule set can be assigned to a particular application. For example, a sales application is assigned a first rule set, while a marketing application is assigned a second rule set. Furthermore, one or more rule sets included in the multiple rule sets 120 can relate to a particular language. For example, the rule sets 120 can include an English-language rule set and a German-language rule set for the same sales application, wherein the applicable rule set is selected based on a determination of which language is relevant. In some implementations, rules are assigned to their respective applications by being included in a particular file, data structure, or combination of these. For example, the English-language rule set assigned to the sales application can be included in the "salesrulesen.xml" file, or any other file or data structure that includes the English-language rule set assigned to the sales application.

Each rule set includes any number of rules. In some implementations, each rule set can include one or more module rules, page rules, and parameter rules. The one or more page rules can identify a document identifier that can be included in a translated URL based on a matching of the page rule with the portion of the URL. For example, the page rule "<externalURL>/shop</externalURL><internalURL>:catalogue.xhtml</internal URL>"

includes a document identifier "catalogue.xhtml" for inclusion in the translated URL. In some implementations, the page rules are identified in the rule set using a page rule declaration. For example, the above page rule can be identified as a page rule by being encapsulated by the "<pageRule></pageRule>" declaration. That is, "<pageRule><externalURL>/shop</externalURL><internalURL>:catalogue.xhtml</internalURL></pageRule>."

The one or more module rules can specify an application identifier corresponding to an application that can be included in the translated URL based on a matching of the module rule with the portion of the URL. For example, the module rule "<externalURL>/sales</externalURL><internalURL>/com/sales_app</internalURL>"

identifies the sales application to be included in the translated URL. In some implementations, the module rule is identified in the rule set using a module rule declaration. For example, the above module rule can be identified as a module rule by being encapsulated by the "<moduleRule></moduleRule>" declaration. That is, "<moduleRule><externalURL>/sales</externalURL><internalURL>/com/sales_app</internalURL></moduleRule>."

The one or more parameter rules can specify a parameter to be provided to the application by including the parameter in the translated URL. Furthermore, the identified parameter can be included in the translated URL based on a matching of the parameter rule with the portion of the URL. For example, the parameter rule "<externalURL>/product/([0-9]+)</externalURL><internalURL>product_id=$1</internalURL>"

specifies a product parameter that can be provided to the sales application and can be included in the translated URL. In some implementations, the parameter rules can be identified in the rule set using a parameter rule declaration. For example, the above parameter rule can be identified as a parameter rule by being encapsulated by the "<ruleSet></ruleSet>" declaration. That is, "<ruleSet><externalURL>/product/([0-9]+)</externalURL><internalURL>product_id=$1</internalURL></ruleSet>."

Moreover, the rule sets 120 can include a number of framework rules. In some implementations, the framework rules are common rules that are included in at least some of the rule sets. In other implementations, the framework rules are a separate rule set that are applied in addition to the rules of a particular rule set. For example, a language rule "<externalURL>/[a-z]{2}</externalURL><internalURL>language=$1</internalURL>"

when matched with the external URL portion

"/de/kategotie/drucker/"

would include the internal URL portion

"language=de"

in the translated URL. Furthermore, the rule engine 118 can use the language rules to determine a language-specific rule set to use when applying further rules. For example, the rule engine 118 can select the German-language rule set for the sales application if the example framework rule matched a portion of the URL. In some implementations, the framework rules are included in their own separate file or data structure. For example, the framework rules can be included in the file "frameworkrules.xml," or any other file or data structure that includes the framework rules.

Additionally, in some implementations, each rule in the rule set can be one of a replacement rule, a recursive rule, an exclusive rule, and a stop rule. A replacement rule specifies one inclusion of the internal URL portion or the external URL portion in the translated URL corresponding to a first matching of the replacement rule with the portion of the URL. For example, the rule "<externalURL>/shop</externalURL><internalURL>:shop.xhtml</internalURL>"

when applied to the URL portion

"/sales/shop/category"

yields the translated URL portion

"/sales:shop.xhtml/category."

Furthermore, the same rule, when applied to the internal URL portion

".com/sales_app:shop.xhtml?category_id=pens"

yields the translated URL portion

".com/sales_app/shop?category_id=pens."

A recursive rule specifies a number of inclusions of the internal URL portion or the external URL portion in the translated URL equal to a number of matches of the rule with the URL. For example, the rule "<externalURL>/(+w)/(+w)</externalURL><internalURL>$1=$2</internalURL>"

when applied to the URL portion

"/name1/value1/name2/value2"

would yield the translated URL

"name1=value1&name2=value2."

In some implementations, the rule can include a rule control parameter. For example, the replacement rule "<externalURL>/(+w)/(+w)</externalURL><internalURL>$1=$2</internalURL>"

can additionally include a rule control parameter and can be defined as

"<rule><externalURL>/(+w)/(+w)</externalURL><internalURL>$1=$2</internalURL><ruleControl>N_TIMES</ruleControl></rule>." An exclusive rule specifies that the internal URL portion or the external URL portion is not included in the translated URL corresponding to any matching of the rule with the portion of the URL. For example, the exclusive rule "<externalURL>(\w+)=(\w+)</externalURL><internalURL>$1=$2</externalURL>"

when applied to the URL portion

"bad_param=value"
would not include anything in the translated URL. As another example, the exclusive rule can be defined using the rule control parameter described above to yield a rule definition of "<rule><externalURL>(\w+)=(\w+)</externalURL><internalURL>$1=$2</externalURL><ruleControl>N_EXCLUDE</ruleControl></Rule>."

A stop rule specifies ceasing any further matching after the stop rule is matched with the portion of the URL. For example, the rule "<rule><externalURL>\invalid</externalURL><internalURL>:invalid.xhtml</externalURL><ruleControl>STOP</ruleControl></Rule>"

specifies that the system cease matching additional rules if the external URL portion "\invalid" or the internal URL portion ":invalid.xhtml" matched a received URL.

In some implementations, the rule engine 118 can translate one or more keywords provided by a user into regular expressions used in the one or more rules. For example, the external URL portion "<externalURL>/$word$/$number$</externalURL>"

can be translated by the rule engine into an equivalent regular expression

"<externalURL>/(\w+)/[0.9]+</externalURL>."

As such, users of the computing system 102 need not be familiar with regular expressions, although the computing system 102 allows users to define rules using regular expressions as well.

In general, the rule engine 118 can perform uni- or bi-directional translation of URLs using any rule in any of the selected rule sets. That is, using the same rule in a selected rule set, the rule engine 118 can translate a portion of an internal URL into a portion of an external URL, and the portion of the external URL into the portion of the internal URL, according to a matching of the rule and a portion of a URL. For example, the rule "<externalURL>/shop</externalURL><internalURL>:shop.xhtml</internalURL>"

would match either the URL portion
"/shop"
or
":shop.xhtml"
and translate the matched URL portion into
":shop.xhtml"
or
"/shop,"

respectively. Because each rule set is assigned to a specific application, some of the rules can identify a different URL portion to include in the translated URL for the same received URL portion. For example, consider a first rule "<externalURL>/order</externalURL>:orderprocessing.xhtml<internalURL></internalURL>"

for a sales application and a second rule

"<externalURL>/order</externalURL>:ordertracking.xhtml<internalURL></internalURL>"

for an order status application application. The received URL portion

"/order"

would match both the first and second rules, but because the application is determined to be the sales application, as described in more detail below, the received URL is translated to ":orderprocessing.xhtml,"
instead of
":ordertracking.xhtml."

In some implementations, one or more rules in a rule set includes one or more rules that specify an external URL portion or an internal URL portion to be included in the translated URL, according to the matching of the rule with the received URL, but not both. For example, the rule "<externalURL>/category/(\w+)</externalURL><internalURL>category_id=$1</internalURL>"

specifies an internal URL portion to be included in a translated URL, based on the matching of the external URL portion with the received URL. However, the same rule cannot be used to include an external URL portion in a translated URL, because the internal URL portion of the rule (i.e., "category_id=$1") would not match an internal URL portion with a received URL in a meaningful way. That is, the $1 identifier is an output value based on a matching, and not an input value that describes how to match an internal URL portion with a received URL. In such implementations, when the rule engine 118 is initialized, the rule engine 118 can analyze one or more rules in the one or more rule sets and generate additional rules based on the analyzed rules. For example, the rule "<externalURL>/category/$1</externalURL><internalURL>category_id=(\w+)<\internalURL>"

can be generated by analyzing the rule

"<externalURL>/category/(\w+)</externalURL><internalURL>category_id=$1</internalURL>."

That is, the generated rule specifies a rule that can include an external URL portion in a translated URL based on a matching of the an internal URL portion with a received URL.

The computer devices 106-110 can include any or all of a desktop computer 106, a laptop computer 108, and a mobile device 110, including a cell phone, handheld computer or other mobile device. Other computer devices 106-110 are also possible. The computer devices 106-110 can communicate with the computer system 102 using the network 104. The network 104 is any network that can facilitate communications between the computer system 102 and any of the computer devices 106-110 and the desktop computers 104. Example networks include local area networks (LANs) and wide area networks (WANs) such as intranets, and The Internet, respectively. In some implementations, the network 104 can be a collection of one or more networks that communicate with each other to form a larger network. In general, network 104 implements a communication protocol (e.g., Transmission Control Protocol/Internet Protocol (TCP/IP), User Datagram Protocol (UDP), and other protocols) to exchange data between two or more sources (e.g., the computer system 102 and any of the computer devices 106-110).

The document converter 114 can receive a document and translate one or more of URLs included in the document using the address translation module 116. For example, the document converter 114 can parse or use other techniques to identify one or more URLs included in the document and provide any of the identified URLs to the address translation module 116 for translation.

The address translation module 116 can be used to translate from an external URL to an internal URL, and from an internal URL to an external URL. In general, the address translation module 116 selects an appropriate rule set and uses the rule engine 118 to match the rules in the selected rule set with an untranslated URL. By matching the rules in the selected rule set, the address translation module 116 identifies one or more portions to be included in a translated URL. Techniques for selecting the rule set and matching the rules are described in more detail below. In some implementations, the address translation module 116 determines if the untranslated URLs should be translated. For example, in some implementations, the address translation module 116 is configured with a flag or other Boolean logic that specifies if a translation should occur from an internal URL representation to an external URL representation. In such implementations, if the flag is set to false, the address translation module 116 provides the untranslated internal URL to the computer system 102 instead of translating the internal URL to an external URL. If the flag is set to true, then the address translation module 116 translates the internal URL to an external URL.

Furthermore, in some implementations, the address translation module 116 can determine if portions of the untranslated URL are internal URL portions or external URL portions before attempting to translated from an external URL to an internal URL. That is, if the received URL or portions thereof is already in an internal URL format, the address translation module 116 need not translate those portions into an internal URL format. In such implementations, the address translation module 116 can provide the untranslated URL portions (and any translated URL portions) to the computer system 102.

To further illustrate the system 100, consider the following example. A user of any of the computer devices 106-110 can view a document, such as a web page, on that device. In general, the document can be viewed in a browser application, such as Windows Internet Explore™ developed by Microsoft Corporation of Redmond, Wash., Mozilla Firefox™, developed by the Mozilla Corporation of Mountain View, Calif. In some implementations, the user may want to view a different document in the browser application. In general, the user can select any of the other URLs included in the viewed document to view a different document or access an associated resource, such as an embedded application or other resource. In response to the selection of the URL, any of the computer devices 106-110 can send the selected URL to the computer system 102 using network 104. For example, the user can select the URL "www.mysite.com/en/sales/shop/category/printers/product/123"

which is received by the computer system 102.

In response, the computer system 102 can translate the external URL to an internal URL using the address translation module 116 and the rule engine 118. For example, in some implementations, the address translation module determines that the received URL is in an external URL format. In general, this determination occurs by matching one or more rules to the received URL to determine if the received URL matches an external URL portion or an internal URL portion, according to the rule sets 120. If the address translation module 116 determines that a translation should occur, the address translation module 116 can translate the external URL above into the internal URL "www.mysite.com/sales_app:shop.xhtml?language=en& category_id=printers&product_id=123."

For example, the address translation module 116 can select a rule set assigned the sales application and use the rule engine 118 to apply the rules of the selected rule set to the received URL to generate the translated URL. Furthermore, the computer system 102 can reference the resource identified by the translated internal URL and provide the resource or a portion thereof to any of the computer devices 106-110.

In some implementations, the computer system 102 can first provide the identified resource to the document converter 114, which can translate one or more URLs included in the identified resource into external URLs using the address translation module 116. In such implementations, users of the computer devices 106-110 receive resources that include at least some external URLs instead of the respective internal URLs. The user can use the external and internal URLs included in the received resource (or portion thereof) to access additional resources managed by the computer system 102 by selecting particular URL included in the resource.

Figure 2:
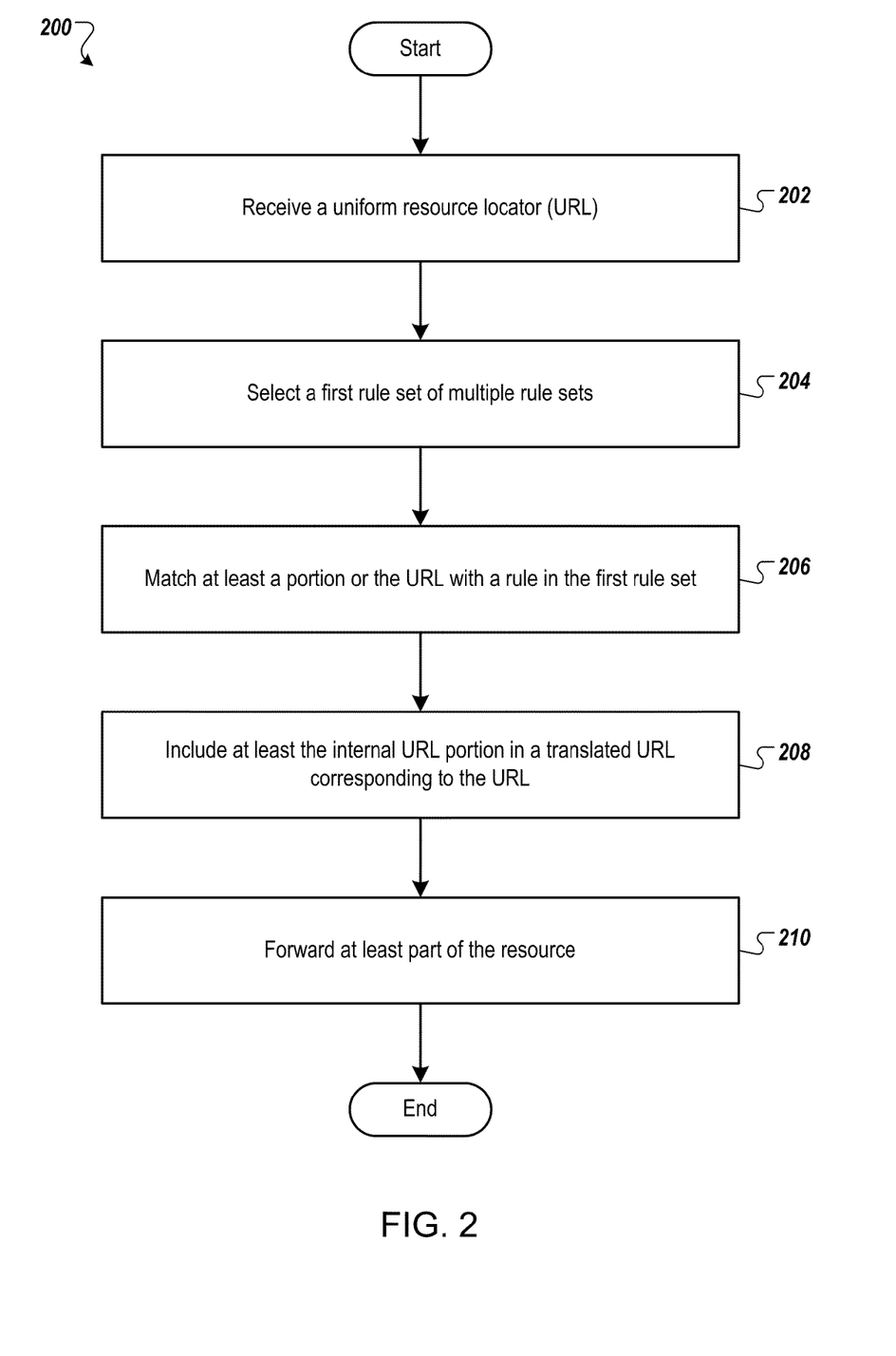
FIG. 2 shows an example technique that can be used to translate a URL into an internal URL

FIG. 2 shows an example technique 200 that can be used to translate an external URL into an internal URL. For convenience, the technique will be described in reference to FIG. 1 and a system (e.g., computer system 102) that performs the technique.

In step 202, the system receives a URL. For example, the computer system 102 can receive an external URL from any of the computer devices 106-110. In general, the URL refers to a resource managed by a first application of multiple applications in the computer system. For example, the external URL "www.mysite.com/en/sales/shop/category/printers/product/123"

refers to a resource managed by a sales application. In addition, the system uses an internal URL for the resource managed by the sales application. For example, the system can use an internal URL "www.mysite.com/sales_app:shop.xhtml?language=en& category_id=printers&product_id=123"

to reference or otherwise access the resource managed by the sales application. In some implementations, the computer system can receive the URL using an application program interface (API) a hypertext transfer protocol (HTTP) request, or using other mechanisms. In some implementations, in step 202, the system can determine if the received URL should be translated. For example, if the received URL is in an internal URL format, the system need not translate the received URL. That is, if the received URL or portions thereof matches an internal URL portion of a rule (e.g., <internalURL>language [a-z]{2}</internalURL>, then the system can use the received URL or portions thereof as if the system had translated the URL using the steps 204-208 of technique 200.

In step 204, the system selects a first rule set of multiple rule sets. In general, each of the multiple rule sets is assigned to a respective one of the multiple applications. For example, a sales application can be assigned a first rule set, and a marketing application can be assigned a second rule set. The system can determine the rule set assigned to the respective application by matching a portion of the external URL with a mapping. For example, the system can use a hash map to lookup the rule set assigned to the application "/sales" and select that assigned rule set based on the value in the hash map.

In step 206, the system matches at least a portion or the URL with a rule in the first rule set. For example, the system can match portions of the external URL "www.mysite.com/en/sales/shop/category/printers/product/123"

with rules in the selected rule set by using string comparisons or other comparisons. Matching is described in examples below.

In step 208, the system includes at least the internal URL portion in a translated URL corresponding to the URL. For example, the system can include the internal URL portion "/com/sales_app"

corresponding to the external URL portion

"/sales"

based on matching a rule in the rule set with that external URL portion.

In step 210, the system forwards at least part of the resource. For example, the system can forward at least a part of the resource corresponding to the translated URL "www.mysite.com/sales_app:shop.xhtml?language=en&category_id=printers&product_id=123"

(the translated URL being generated through any number of iterations of the matching and inclusion steps 206 and 208, respectively) to any of the computing devices 106-110. In some implementations, the system accesses the resource and translates one or more internal URLs included in the resource into external URLs before forwarding the portion of the resource. An example technique for translating internal URLs to external URLs is described in reference to FIG. 3.

Figure 3:
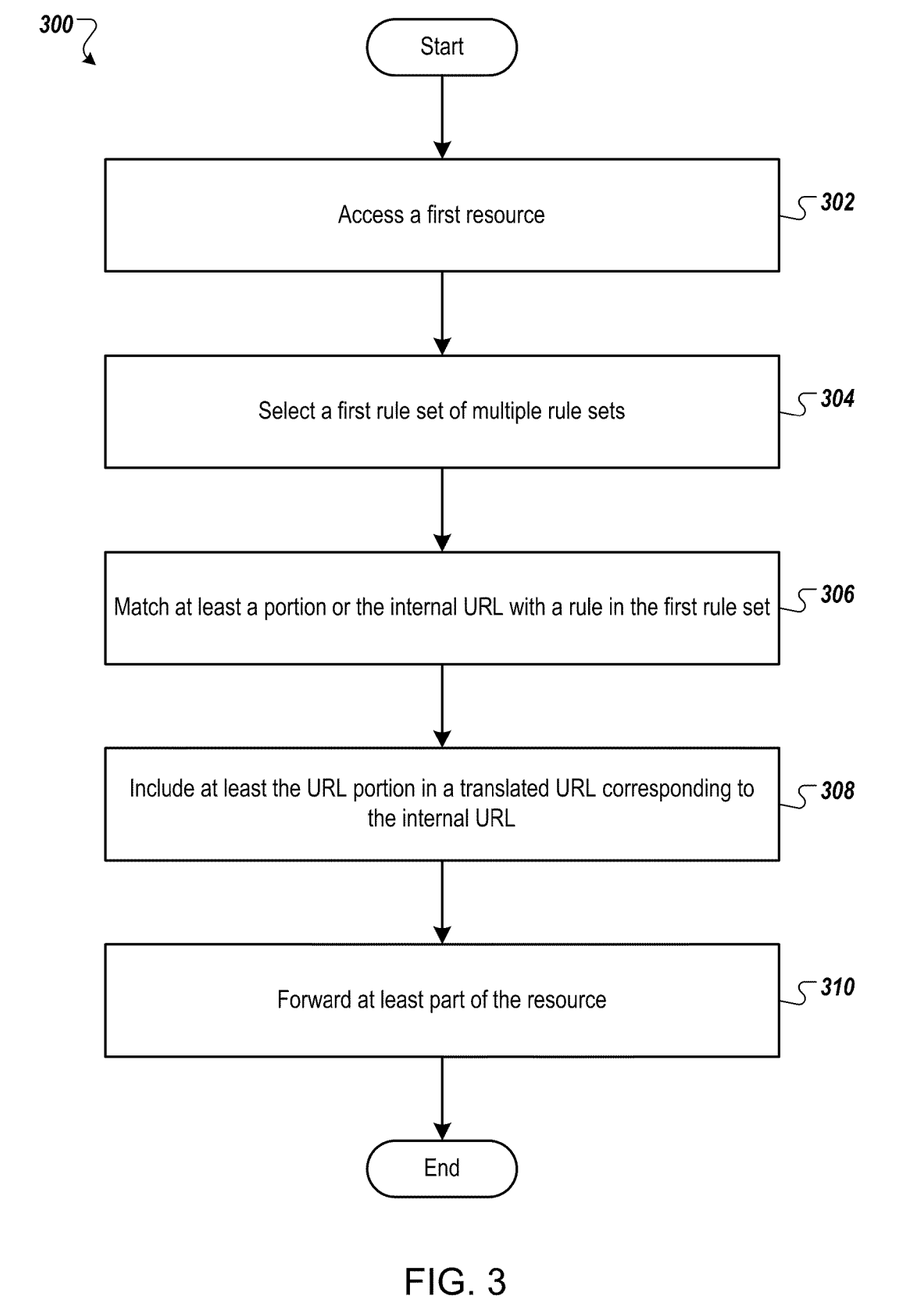
FIG. 3 shows an example technique that can be used to translate an internal URL into a URL.

FIG. 3 shows an example technique 300 that can be used to translate an internal URL into an external URL. For convenience, the technique will be described in reference to FIG. 1, and a system (e.g., computer system 102) that performs the technique.

In step 302, the system accesses a first resource. In general, the system accesses the resource in response to a request from a computer device. For example, the computer system 102 can access any of the resources 112 in response to receiving a URL from the computer devices 106-110. In addition, the first resource can include at least one internal URL. In general, the internal URL refers to a second resource managed by one application of multiple applications in the computer system. For example, the second resource can include the internal URL "/www.mysite.com/hr_app:applicationform.xhtml?job_title=02022009&user_id=bob&language=en"

corresponding to a second resource 112 managed by the computer system 102. In some implementations, in step 302, the system can determine if the internal URLs included in the first resource should be translated. For example, the rule engine 118 can be configured with a Boolean flag or other program logic that specifies if internal URLs should be translated to external URLs using steps 304-308 of technique 300.

That is, if the internal URLs are not translated, the internal URLs can be included in an untranslated format for use in step 310.

In step 304, the system selects a first rule set of multiple rule sets. In general, each of the multiple rule sets is assigned to a respective one of the multiple applications. The system can determine the rule set assigned to the respective application by matching a portion of the internal URL with a mapping. For example, the system can use a hash map to lookup the rule set assigned to the application "/com/hr_app"

and select that assigned rule set based on the value in the hash map.

In step 306, the system matches at least a portion or the URL with a rule in the first rule set. For example, the system can match portions of the internal URL "/com/hr_app:applicationform.xhtml?job_title=02022009&user_id=bob&language=en"

with rules in the selected rule set by using string comparisons or other comparisons. Matching is described in examples below.

In step 308, the system includes at least the URL portion in a translated URL corresponding to the internal URL. In step 208, the system includes at least the internal URL portion in a translated URL corresponding to the URL. For example, the system can include the external URL portion "/hr"

corresponding to the internal URL portion

"/com/hr_app"

based on matching a rule in the rule set with that internal URL portion.

In step 310, the system forwards at least part of the resource. For example, the system can forward at least a portion of the resource including the translated URL "/en/user/bob/hr/apply/job/02022009"

(the translated URL being generated through any number of iterations of the matching and inclusion steps 306 and 308, respectively) to any of the computing devices 106-110.

Figure 4A:
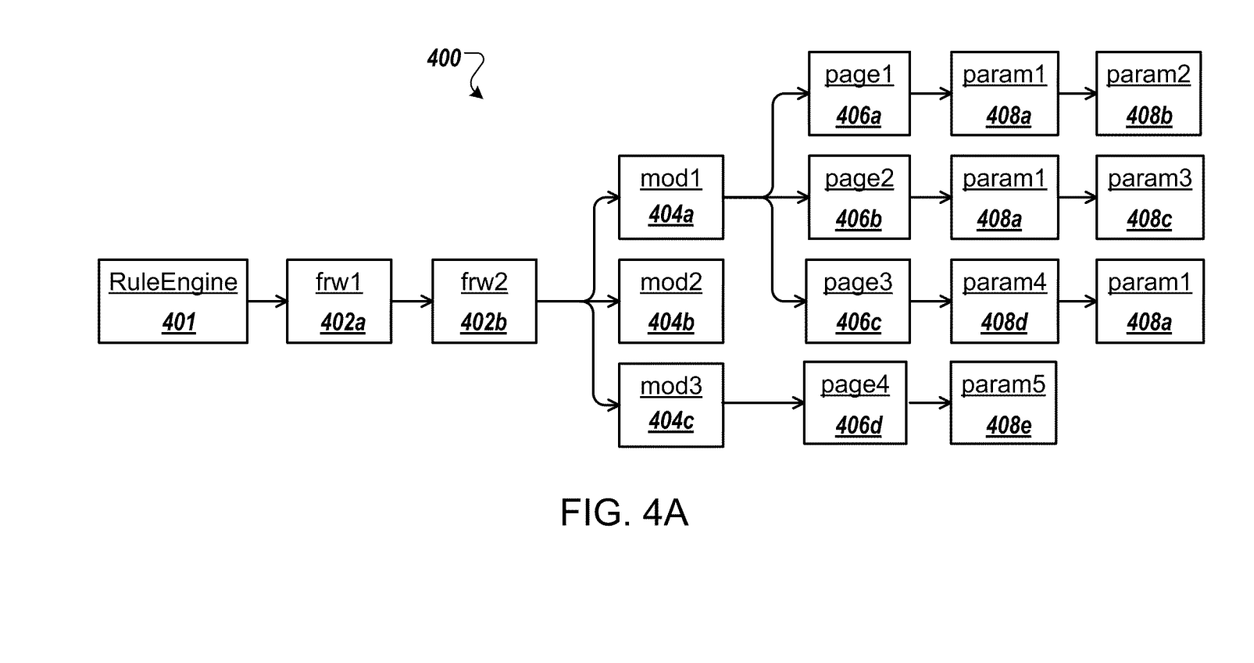
FIGS. 4A-4C show examples of techniques that can be used to apply rules to URLs according to different orders.
Figure 4B:
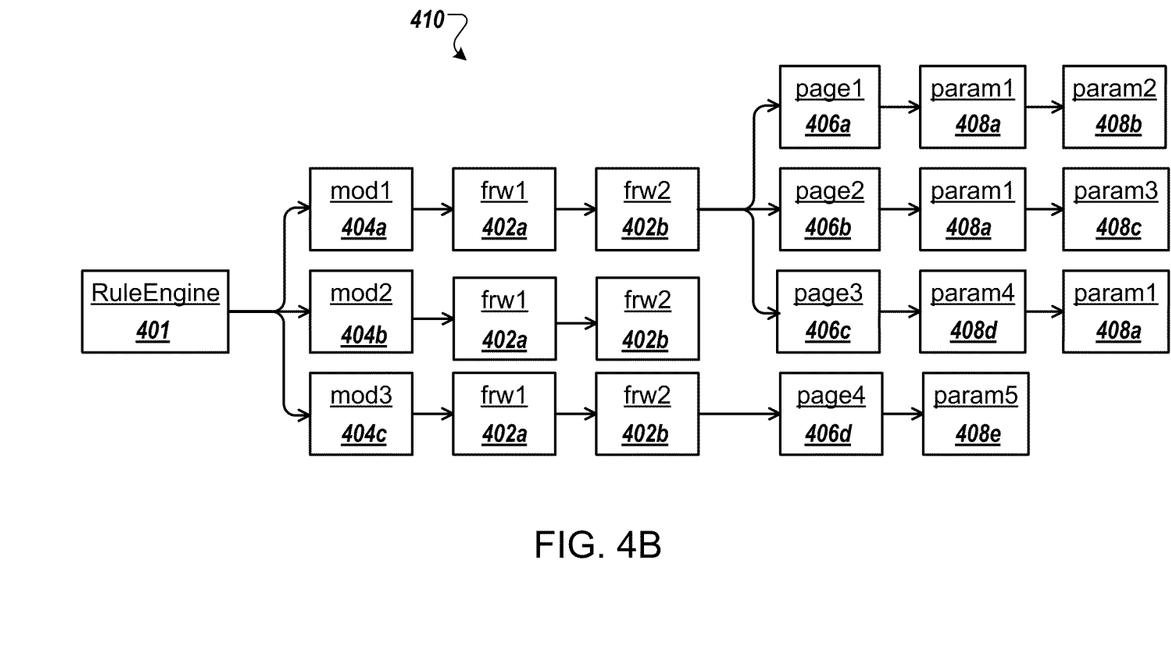
Figure 4C:
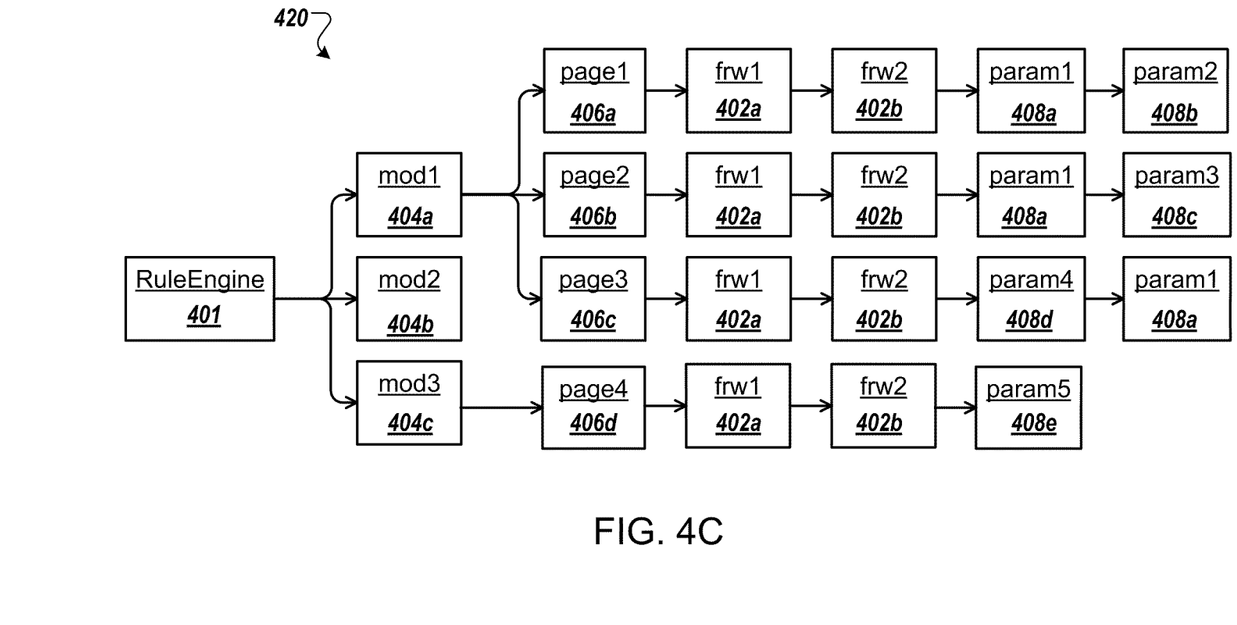

FIGS. 4A-4C show examples techniques 400, 410, and 420, respectively that can be used to apply rules to URLs according to different orders. In general, the address translation module 116 can be configured to apply the rules from the multiple rule sets 120 in a predetermined order to translate a URL from an internal URL to an external URL and from an external URL to an internal URL. For example, in some implementations, the rules in a rule set can specify the next rule to apply according to a matching of the rule and the URL. For all three examples shown in FIGS. 4A-4C, the rules are specified by TABLE 1.

TABLE 1

| NAME | RULE |
|---|---|
| fw1 | \<externalURL\>/)[a-z]{2})\</externalURL\>\<internalURL\>language=$1\</internalURL\> |
| fw2 | \<externalURL\>/user/(\w+)\</externalURL\>\<internalURL\>user_id=$1\</internalURL\> |
| mod1 | \<externalURL\>/sales\</externalURL\>\<internalURL\>/com/sales_app\</internalURL\> |
| mod2 | \<externalURL\>/marketing\</externalURL\>\<internalURL\>/com.marketing\</internalURL\> |
| mod3 | \<externalURL\>/hr\</externalURL\>\<internalURL\>/com/hr_app\</internalURL\> |
| page1 | "\<externalURL\>/apply\</externalURL\>:refundapplication.xhtml\<internalURL\>\</internalURL\>" |
| page2 | "\<externalURL\>/shop\</externalURL\>\<internalURL\>:catalogue.xhtml\</internalURL\>" |
| page3 | "\<externalURL\>/coupon\</externalURL\>\<internalURL\>:couponcenter.xhtml\</internalURL\>" |
| page4 | "\<externalURL\>/apply\</externalURL\>\<internalURL\>:applicationform.xhtml\</internalURL\>" |
| param1 | "\<externalURL\>/category/(\w+)\</externalURL\>\<internalURL\>:category_id=$1\</internalURL\>" |
| param2 | "\<externalURL\>/product/([0-9]+)\</externalURL\>\<internalURL\>product_id=$1\</internalURL\>" |
| param3 | "\<externalURL\>/filter/(\w+)\</externalURL\>\<internalURL\>filter=$1\</internalURL\>" |
| param4 | "\<externalURL\>/code/(\w+)\</externalURL\>\<internalURL\>coupon_code_id=$1\</internalURL\>" |
| param5 | "\<externalURL\>/job/(\w+)\</externalURL\>\<internalURL\>job_id=$1\</internalURL\>" |

For simplicity, in the example rules provided in TABLE 1, the respective declarations have been omitted. For example, the "\<moduleRule\>\</moduleRule\>"

declaration has been omitted from the mod1 rule, mod2 rule, and mod3 rule. Furthermore, the mod1, page1, page2, page3, param1, param2, param3, and param4 rules are assigned to the sales application. In addition, the mod2 rule is assigned to the marketing application and the mod3, page4, and param5 rules are assigned to the hr (e.g., human resources) application. In each of techniques 400, 410, and 420, the rule engine 118 can be initialized in step 401. In some implementations, this can include accessing a configuration file the specifies one or more configuration parameters for the rule engine 118. For example, the configuration file can include one or more parameters that specify an ordering of the rules (e.g., the parameters can specify that the rule engine 118 perform any of the techniques 400, 410, or 420). As another example, the configuration file can include one or more parameters that specify the locations of the one or more rule sets (e.g., the file path for the rule set "salesrulesen.xml," any framework rule sets, or other rule sets). In some implementations (as described in more detail below), the rules can specify an order. That is, the rules can specify which of techniques 400, 410, and 420 the rule engine 118 uses.

FIG. 4A shows an example technique 400 whereby the address translation module applies the framework rules before the module rules, applies the module rules before page rules, and applies the page rules before the parameter rules. For example, consider the external URL portion "/en/user/bob/sales/apply/category/printers/product/123."

First, in step 402a, the address translation module 116 applies the fw1 rule using the rule engine 118 which matches "/en"

in the example external URL portion. In general the address translation module 116 can access the framework rules because the address translation module 116 is configured with a file path, URL, or other information that specifies the location of the framework rules.

Because the fw1 rule matches the external URL portion, the internalURL portion

"language_id=en"

is included in the translated URL. As the address translation module 116 continues to match rules with portions of the external URL using the rule engine 118, the address translation module 116 identifies additional internal URL portions for inclusion in the translated URL. For example, in step 402b, matching the fw2 rule with the external URL portion "/user/bob/sales/apply/category/printers/product/123"

identifies an internal URL portion

"user_id=bob"

that can be included in the translated URL.

Once the address translation module 116 has applied the framework rules, the address translation module 116 can attempt to apply the module rules, according to the example of FIG. 4A. When the address translation module 116 attempts to match the module rules with the external URL, it can use a mapping to lookup the location of the respective module rules. For example, the address translation module 116 can use a hash map to lookup the location of any of the mod1, mod2 and mod3 rules. Using the respective rule sets assigned to the sales, marketing, and hr applications, the address translation module 116 can identify that the sales application rule set should be used because the external URL portion matches the module rule assigned to the sales application. That is, the "<externalURL>/sales</externalURL><internalURL>/com/sales_app</internalURL>"

rule matches the external URL portion

"/sales/apply/category/printers/product/123."

Once the address translation module 116 has identified the correct application, in step 404a, 404b, or 404c (according to the application) the address translation module 116 can select the identified rule set and match the remaining application specific rules to the external URL portion using the rule engine 118 to generate the translated URL. That is, because the address translation module 116 identified the application as the sales application, the address translation module 116 proceeds to step 404a to apply the sales rule to the received URL.

In some implementations, the address translation module 116 does not attempt to match rules in a rule set with portions of the received URL that have already been matched. For example, the address translation module 116 can attempt to match, in step 406a, the external URL portion "/apply/category/printers/product/123"

with the page1 rule (because the URL portion "/en/user/bob/sales" has been previously matched with other rules). Furthermore, the address translation module 116 can attempt to match, in step 408a and 408b, the external URL portion "/category/printers/product/123"

with the param1 rule, and the external URL portion

"/printers/product/123"

with the param2 rule, respectively, because all other portions of the received URL have been matched with other rules. This allows the address translation module 116 to generate a translated URL of "/com/sales_app:refundapplication.xhtml?&category_id=printers&product_id=123&user_id=bob&language=en"

by matching rules to untranslated portions only.

Other URL portions can also be matched according to a similar process. For example, the external URL "/en/user/bob/hr/apply/job/02022009"

can be translated into the internal URL portion

"/com/hr_app:applicationform.xhtml?job_title=02022009&user_id=bob&language=en"

by first applying the fw1 rule, then the fw2 rule, then the mod3 rule, then the page 4 rule, and then the param5 rule according to steps 402a, 402b, 404c, 406d, and 408e, respectively. Notice that in this example, the external URL portion "/apply"

is translated into a different internal URL portion than the example described using the steps 402a, 402b, 406a, 408a, and 408b.

FIG. 4B shows an example technique 410 whereby the address translation module applies the module rules before the framework rules, applies the framework rules before page rules, and applies the page rules before the parameter rules. FIG. 4C shows an example technique 420 whereby the address translation module applies the module rules before the page rules, applies the page rules before framework rules, and applies the framework rules before the parameter rules. The computing system 102 can use the address translation module 116 and the rule engine 118 in a similar manner as described above to translate an external URL to an internal URL using either of the orders illustrated in FIG. 4B or FIG. 4C.

Regardless of the order by which the address translation module 116 is configured to apply the rules, an external URL portion can be translated into the same internal URL portion, and an internal URL portion can be translated into the same internal URL portion. That is, the external URL portion "/en/user/bob/sales/apply/category/printers/product/123"

can be translated into the internal URL portion

"/com/sales_app:refundapplication.xhtml?&category_id=printers&product_id=123&user_id=bob&language=en"

regardless of whether the address translation module 116 is configured to apply the rules in an order illustrated by FIG. 4A, FIG. 4B or FIG. 4C.

In addition, the address translation module 116 can use the rules in TABLE 1 (or additional rules generated therefrom by the rule engine 118, as described above) to translate the internal URL portion "/com/sales_app:shop.xhtml?category_id=printers&product_id=123&user_id=bob&language=en"

to the external URL portion

"/en/user/bob/sales/shop/category/printers/product/123"

using any of the orderings illustrated in FIGS. 4A-4C.

In some implementations, the rules of a rule set specify an order to apply the rules. For example, rules can be organized in a tree structure or other organization that specifies that one rule should be applied before another. That is, the rules can be nested in a such a way the specifies an ordering to apply the rules. In the examples of FIG. 4A, if the address translation module 116 applies the page1 rule in step 406a, the organization of the rules also specifies that the next rule to apply is the param1 rule in step 408a, and the param2 rule in step 408b, because the param1 and param2 rules are nested within the page1 rule. In such implementations, the rule engine 118 can determine the order specified by the rule set during the initialization step 401. In some implementations, a rule can specify the next rule to apply without translating a portion of the URL. For example, a so-called "empty" rule specifies the next rule to apply without translating a portion of the received URL to an internal URL or external URL. As another example a so-called "key based rule" rule specifies both the next rule to apply and a translation of the received URL to either an internal URL or an external URL, according to the matching. Empty rules and key based rules are described in more detail below.

Figure 5:
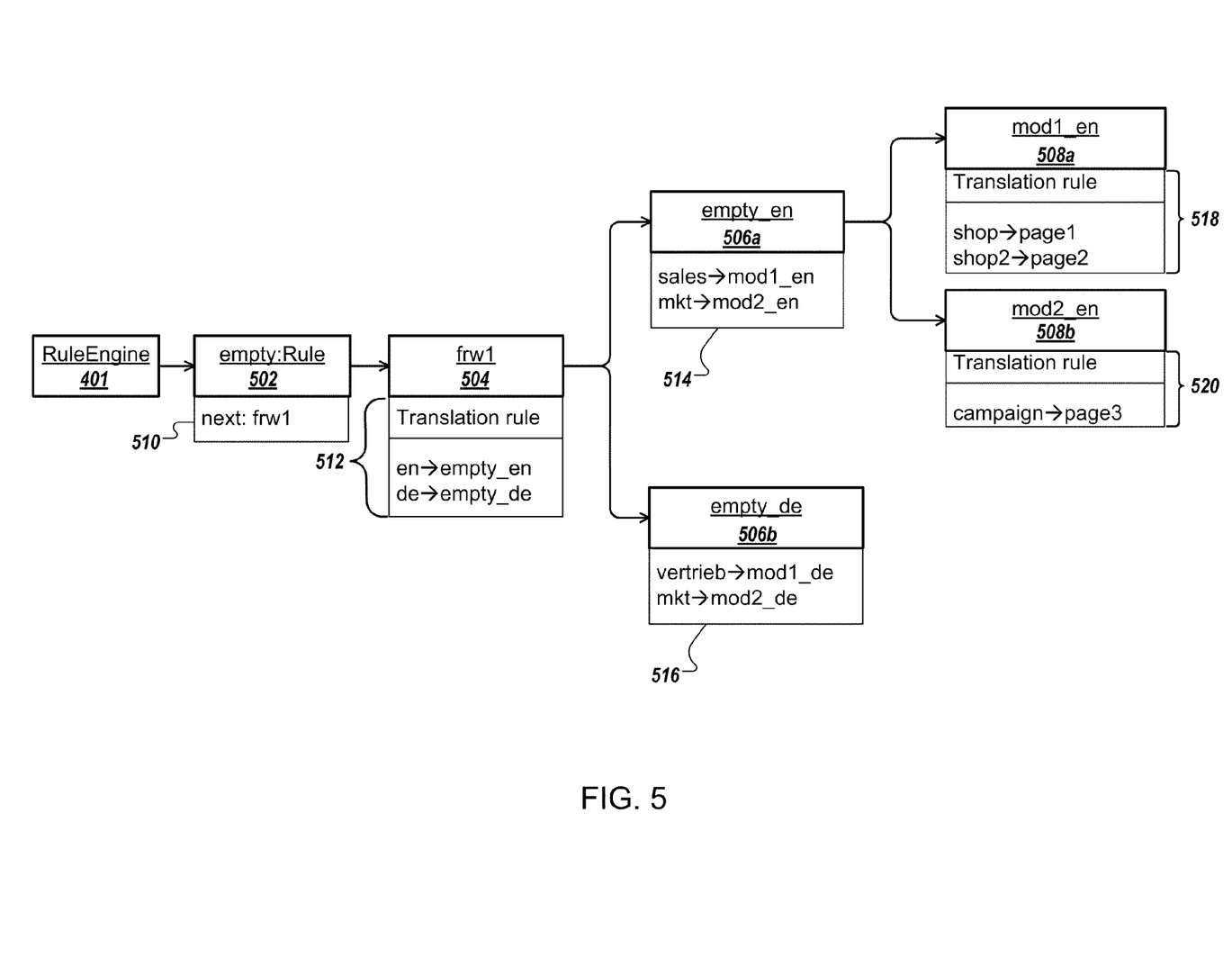
FIG. 5 shows an example of applying a framework rule to a URL.

FIG. 5 shows an example technique 500 that can be used to apply a framework rule, such as a language rule, to a URL. As described above, the rule engine 118 can be initialized in step 401. Again, certain rules can specify the order of applying subsequent rules. For example, in step 502, the rule engine 118 can apply an empty rule 510 that does not specify a translation to the URL and specifies that the next rule to apply in step 504 is the frw1 rule. As another example, in step 506a, the empty_en rule 514 specifies that the next rule to apply is either the mod1_en rule or the mod2_en rule based on a matching of the empty_en rule 514 with the received URL. That is, if "sales" is matched with the received URL, then the rule mod1_en (e.g., key based rule 518) is applied by the rule engine 118. Furthermore, if "mkt" is matched with the received URL, then the rule mod2_en (e.g., key based rule 520) is applied by the rule engine 118.

In step 504, a key based rule 512 can be applied. That is, the rule engine 118 can translated a portion of the received URL according to the translation rule included in the key based rule 512. For example, the translation rule "<externalURL>/)[a-z]{2})</externalURL><internalURL>language=$1</internalURL>"

can translate an external URL portion into an internal URL portion. Furthermore, depending on a matching of the frw1 translation rule and the received URL, the address translation module can select a language-specific rule set or otherwise select language specific rules included in a previously selected rule set. For example, if the rule engine 118 matches the translation rule "<externalURL>/)[a-z]{2})</externalURL><internalURL>language=$1</internalURL>"

with a portion of the received URL, the $1 parameter can be used to specify a set of language rules to apply. That is, as specified by the key based rule 512, if the $1 parameter equals "en," the address translation module 116 can apply the empty_en rule (e.g., empty rule 514) in step 506a using the rule engine 118. In addition, as specified by the key based rule 512, if the $1 parameter equals "de," the address translation module 116 can apply the empty_de rule (e.g., empty rule 516) in step 506b using the rule engine 118.

Languages and other framework-specific URL portions can be included in the URL in various places, according to different implementations. For example, in one implementations, the language can be specified before the application (e.g., "http://www.mysite.com/en/sales/home"). In another implementations, the language can be specified before the page (e.g., "http://www.mysite.com/sales/en/home"). In other implementations, the language can be specified after the page (e.g., "http://www.mysite.com/sales/home/en"). Regardless of the particular implementations, the address translation module 116 and the rule engine 118 can identify the language or other framework-specific URL portions using the framework rules by matching the framework rules with the URL.

Figure 6:
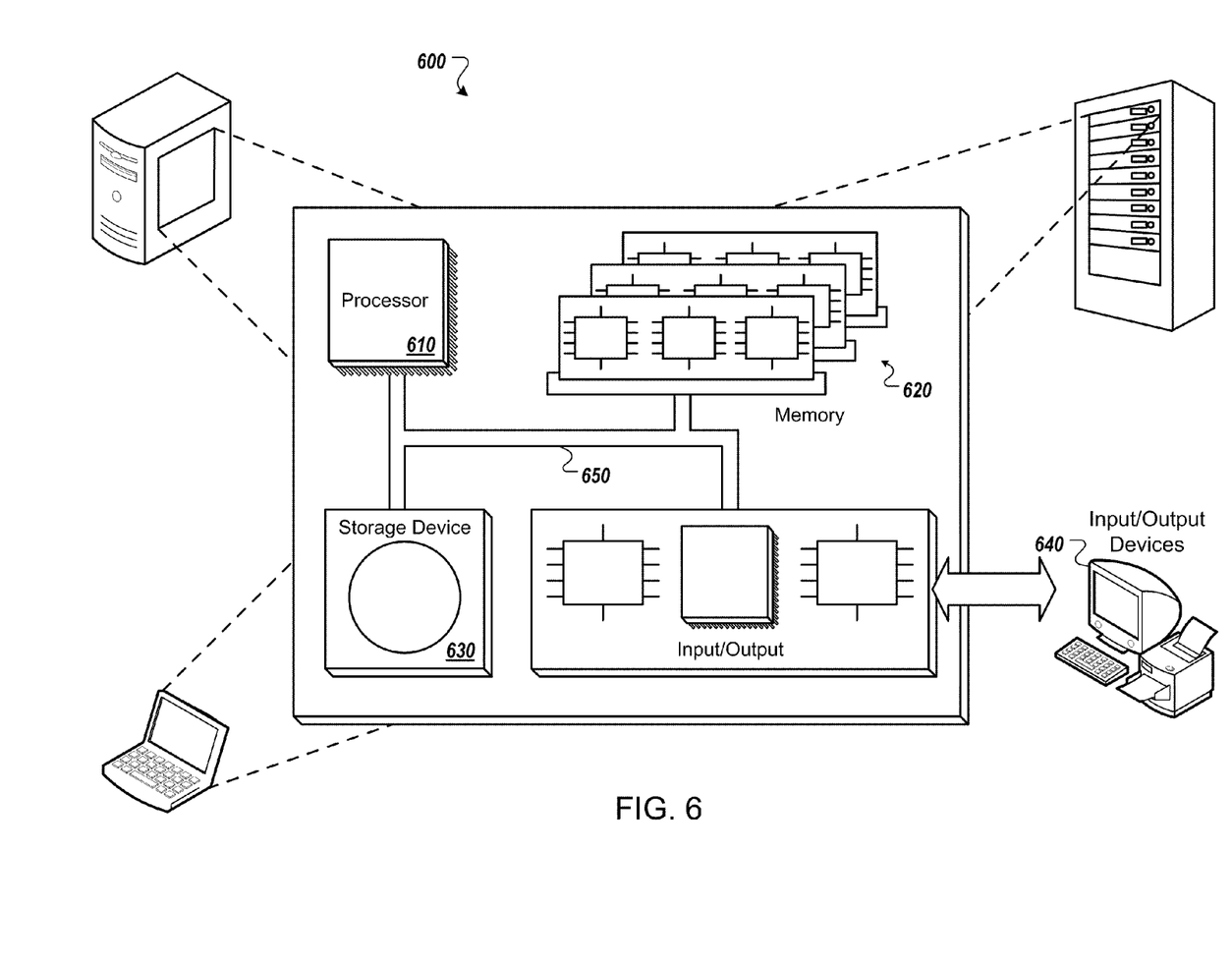
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A system comprising:
   a processor;
   a communication device for communication between the system and at least one computer device; and
   a machine-readable storage device including instructions that when executed by the processor generate:
      multiple applications accessible to the computer device using the communication device, the multiple applications managing resources that in the system are identified using an internal URL representation, wherein the computer device uses an external URL representation for the resources;
      a rule engine including multiple rule sets, each rule set assigned to a respective one of the multiple applications, each of the rule sets including rules that associate portions of external URLs with corresponding portions of internal URLs for the assigned application; and
      an address translation module configured to receive an untranslated URL, select one of the rule sets for the untranslated URL using the rule engine, generate a translated URL corresponding to the untranslated URL using the rule set, wherein translation is done separately for each portion of the untranslated URL, and process the translated URL in response to receiving the untranslated URL;
   wherein at least one of the rule sets includes a first rule that includes a different translation of one of an internal URL portion and an external URL portion than a second rule in another of the rule sets.

2. The system of claim 1, further including instructions that when executed by the processor generate:
   a document converter configured to convert a document from a first representation to a second representation using the address translation module, the first representation including one or more untranslated URLs, and the second representation including one or more translated URLs.

3. The system of claim 1, wherein at least one rule set of the multiple rule sets includes at least one rule generated by the rule engine in response to analyzing one or more rules of the rule set.

4. The system of claim 1, wherein each rule of the multiple rule sets specifies at least one of a URL translation and a next rule to apply to the untranslated URL.

* * * * *